United States Patent [19]

Lewis

[11] 4,311,011
[45] Jan. 19, 1982

[54] SOLAR-WIND ENERGY CONVERSION SYSTEM

[76] Inventor: Arlin C. Lewis, Box AU, Libby, Mont. 59923

[21] Appl. No.: 79,009

[22] Filed: Sep. 26, 1979

[51] Int. Cl.$^3$ ............................................. F03G 7/02
[52] U.S. Cl. ................................ 60/641.15; 60/698; 204/129; 290/1 D; 417/106; 417/107
[58] Field of Search ............... 60/398, 641, 675, 698; 204/129; 290/1 D, 1 R; 417/105, 106, 107; 423/644, 645

[56] References Cited

U.S. PATENT DOCUMENTS

| | | | |
|---|---|---|---|
| 2,688,923 | 9/1954 | Bonaventura | 60/641 X |
| 3,140,986 | 7/1964 | Hubbard | 60/641 X |
| 3,459,953 | 8/1969 | Hughes | 204/129 |
| 3,903,700 | 9/1975 | Glickman | 60/641 |
| 3,983,704 | 10/1976 | McFarland | 60/641 |
| 4,031,702 | 6/1977 | Burnett | 60/641 X |
| 4,099,381 | 7/1978 | Rappoport | 60/641 |
| 4,161,657 | 7/1979 | Shaffer | 60/641 X |
| 4,200,624 | 4/1980 | Muller | 423/644 |
| 4,206,608 | 6/1980 | Bell | 60/641 X |
| 4,216,067 | 8/1980 | Mitchell | 204/129 |

FOREIGN PATENT DOCUMENTS

2757306 7/1979 Fed. Rep. of Germany ........ 60/698

*Primary Examiner*—Robert G. Nilson

*Attorney, Agent, or Firm*—Sughrue, Mion, Zinn, Macpeak & Seas

[57] ABSTRACT

A combined solar-wind energy conversion system in which the combined effects of solar and wind energy are utilized in raising water from a lower to an upper water storage tank to increase its potential energy for generation of electricity. Incoming solar energy heats water to form steam which is temporarily stored. The stored steam is vented to one of first and second steam storage tanks from which it is coupled to first and second water pumping tanks. When the water enters one of the water pumping tanks, it forces the water temporarily stored therein to flow upwards the first steam storage tank. As soon as the water pumping tank is emptied, the steam condenses forming a partial vacuum in the tank. The vacuum causes water to be drawn from the lower water storage tank into the corresponding water pumping tank and the process repeated. The second water pumping tank is filled while the first water storage tank is emptied. Water flowing from the first water storage tank turns an electrical generator. Wind energy is also used to raise water from the second water storage tank to the first water storage tank to increase the available energy. When excess electrical energy is available, it is used to electrolyze water into hydrogen and oxygen which are stored for later burning during periods when insufficient wind and solar energy are available.

12 Claims, 4 Drawing Figures

SOLAR-WIND ENERGY CONVERSION SYSTEM

BACKGROUND OF THE INVENTION

The invention relates to a combined solar and wind energy converstion system which is capable of producing an output of electricity continuously even during times when the solar and wind energy available are insufficient to produce the quantity desired.

Various prior art techniques have been disclosed for generating electricity both as a result of solar energy and as a result of wind movement. However, the advantages attendant upon combining both types of energy generation into a single system which is capable of operating over long periods of time at a very high efficiency even when sufficient quantities of solar and wind energy are unavailable over relatively long periods of time are generally unknown.

In one prior art process such as that disclosed in U.S. Pat. No. 3,903,700 water is raised from a lower tank to an upper tank by means of solar energy. As water is drained from the upper tank back into the lower tank, it operates a hydro-electric generator. However, this system is generally quite inefficient in energy conversion as steam pressure generated in the solar collector is used to drive a turbine which pumps the water from the lower level to the higher level. With pressures typically attainable with solar collectors and the conversion efficiencies of typical turbine pumps, the system efficiency was generally believed to be quite low.

Other techniques, such as that disclosed in U.S. Pat. No. 2,688,923, have utilized solar energy for raising a working fluid such as water from a lower level to a higher level. In this system, containers are filled with water through a valve at the bottom. After the valve is closed, pressure generated by the steam in the solar collector forces the water in the containers up to a higher level. This system is believed to be generally costly and unwieldly as well as being inefficient in that each container requires its own steam generator within the solar collector. Also, there is no utilization of the water at the higher level for generating electricity.

Other complex and generally inefficient systems have been proposed for utilizing solar energy to raise a liquid from a lower level to a higher level for generation of electricity. In U.S. Pat. No. 3,937,599 there is disclosed a system which uses a pump operating with a vaporizable fluid flowing in a closed circuit between a solar evaporator and a condenser. Two separate fluids are required in this system, one to drive the pump and the other to generate the electricity.

Many other types of solar energy converters have been disclosed, for example, those of U.S. Pat. No. 4,031,703; U.S. Pat. Nos. 4,055,948 and 4,089,174. These are merely examples of the myriad of different solar energy conversion systems which have heretobefore been proposed but which are not capable of producing electrical energy continuously over relatively long time periods and which are adaptable for combination with a wind energy conversion system.

SUMMARY OF THE INVENTION

Accordingly, it is an object of the present invention to provide a combined solar and wind energy system which is capable of efficiently producing electricity over relatively long time periods when insufficient quantities of solar and/or wind energy are available.

Moreover, it is an object of the present invention to provide such a system which is relatively inexpensive to construct and which utilizes, so far as possible, easily obtainable components.

These, as well as other others of the invention, may be met by providing a solar-wind energy conversion system, which in its broadest aspects include means for producing kinetic mechanical energy in response to solar energy, means for producing kinetic mechanical energy in response to wind movement, means for producing electrical energy in response to both of the aforementioned kinetic energies, and means for storing energy produced in response to the electrical energy with the electrical energy producing means also producing electrical energy in response to energy stored by the storing means. In accordance with the invention, the potential mechanical energy of a volume of fluid is increased in response to both of the aforementioned kinetic energies and the electrical energy is produced in response to the potential mechanical energy of the fluid.

More specifically, the invention encompasses a solar energy system which includes a boiler for producing steam in response to solar energy, means for directing solar energy towards and for concentrating solar energy at the boiler means, a first water storage tank, a second water storage tank which is positioned lower than the first water storage tank, means for moving water from the second water storage tank to the first water storage tank in response to steam produced by the boiler means, means for returning water from the first water storage tank to the second water storage tank, and means for generating electricity in response to movement of water by the returning means. Means may be provided for storing energy in response to a portion of electrical energy produced by the electricity generating means along with means for heating the boiler means in response to the stored energy when the solar energy and/or wind energy are insufficient to generate the volume of electricity desired, that is they fall below a predetermined level. Preferably, the energy storage means includes means for electrolyzing water in response to the electrical energy and means for storing the hydrogen and oxygen so produced. The hydrogen storage means, in accordance with one aspect of the invention, comprises a tank and gas absorbing medium positioned within the tank. The gas absorbing medium preferably comprises a hydride of either an alloy of titanium and iron or an alloy of magnesium and nickel. In order to move water from the second tank to the first tank in response to steam, a water pumping tank is provided which has a first port in an upper portion thereof and a second port in a lower portion thereof. The first port is coupled to the boiler means for receiving steam therefrom while the second port is coupled to the first water storage tank. Means are included for permitting water flow only in the direction of the first tank while in conjunction with the means for coupling the second port to the second tank there is provided means for permitting water flow only in the direction of the water pumping tank.

Still further in accordance with the invention, a solar energy conversion system can be constructed which includes the combination of boiler means for producing steam in response to solar energy, means for directing solar rays towards a predetermined portion of the boiler means, a primary steam storage tank for collecting and storing the steam produced by the boiler means, first and second water storage tanks with a second water storage tank positioned beneath the first water storage tank, first and second lower steam storage tanks, valve means for selectively coupling the primary steam storage tank to one of the first and second lower steam storage tanks, first and second water pumping tanks which are coupled respectively to the first and second lower steam storage tanks, first coupling means for coupling the first and second lower steam storage tanks to the second water storage tank with the first coupling means having means for permitting water flow only in the direction of the first and second lower steam storage tanks, second coupling means for coupling the first and second lower steam storage tanks to the first water storage tank with the second coupling means having means for permitting water flow only in the direction of the first water storage tank, first pulley means positioned in a region beneath the first water storage tank, second pulley means positioned in a region above the second water storage tank, first endless chain member, which may be a link-type chain, a belt, a band or the like, running between the first and second pulley means, a plurality of bucket means which may be containers of any practical shape suitable for holding water and which are coupled to the chain member at spaced intervals, water spout means for removing water from the first water storage tank to the bucket means in the vicinity of the first pulley means, the water entering the bucket means after they are oriented with their bottoms in a generally downward direction, the second water storage tank having a aperture in the upper portion thereof for receiving water which is dumped from the bucket means as they revolve around the second pulley means, a second endless chain member coupled to the second pulley means, and an electrical generator which is provided input power by way of the second chain member. Also, there may be provided means for electrolyzing water to produce hydrogen and oxygen in response to the electrical current produced by the electrical generator during periods when sufficient wind and/or solar energy are unavailable. The hydrogen and oxygen are compressed into storage tanks. A hydrogen absorbing medium is positioned in the hydrogen storage tank to reduce the pressure therein while increasing the hydrogen storage capacity. The hydrogen and oxygen so stored are burned at a controlled rate to heat the boiler means to produce steam when the solar and/or wind energy available falls below a predetermined minimum level. In regard to the production of energy from wind movement, means is provided in a preferred embodiment, for producing rotational power in response to wind movement which is coupled to means for moving water from the second water storage tank to the first water storage tank in response to the rotational power so produced.

In regard to another aspect of the invention, an energy storage system may be provided which includes for electrolyzing water to produce hydrogen and oxygen, means for compressing the hydrogen produced by the electrolyzing means into a storage tank which includes a hydrogen absorbing medium positioned therein. The oxygen is compressed into a second storage tank therefor. As related above, the hydrogen relating medium comprises preferably either a hydride of an alloy of titanium and iron or a hydride of an alloy of magnesium and nickel. The hydrogen and oxygen are then recombined and burned and electricity generated in response to the thermal energy thereby released.

Still further, the invention can be practiced by a method for producing electricity from solar energy comprising the steps of heating water with solar energy to form steam, storing the steam, forcing water from a first water pumping tank with the steam so produced causing it to flow into a first water storage tank which is located above the first water pumping tank, condensing the steam in the first water pumping tank to form a partial vacuum therein, drawing water into the first water pumping tank from a second water storage tank as a result of the partial vacuum, the second water storage tank being located lower than the first water storage tank, and generating electricity in response to movement of water from the first water storage tank to the second water storage tank. To generate electricity, water is collected from the first water storage tank in a series of bucket members which are coupled to an endless chain to thereby rotate the endless chain and operating electrical generating means in response to rotation of the endless chain. The flow of steam to the first water pumping tank is closed off when most of the water has been forced therefrom at which time the steam is coupled to a second water pumping tank which forces the water therefrom in the same manner as in the first water pumping tank. After the water is forced out of the second pumping tank, the steam which entered therein condenses causing a partial vacuum which results in the drawing of water into the second water pumping tank from the second water storage tank. Water from the second water storage tank may also be pumped to the first water storage tank in response to wind movement.

DESCRIPTION OF THE PREFERRED EMBODIMENTS

Figure 1:
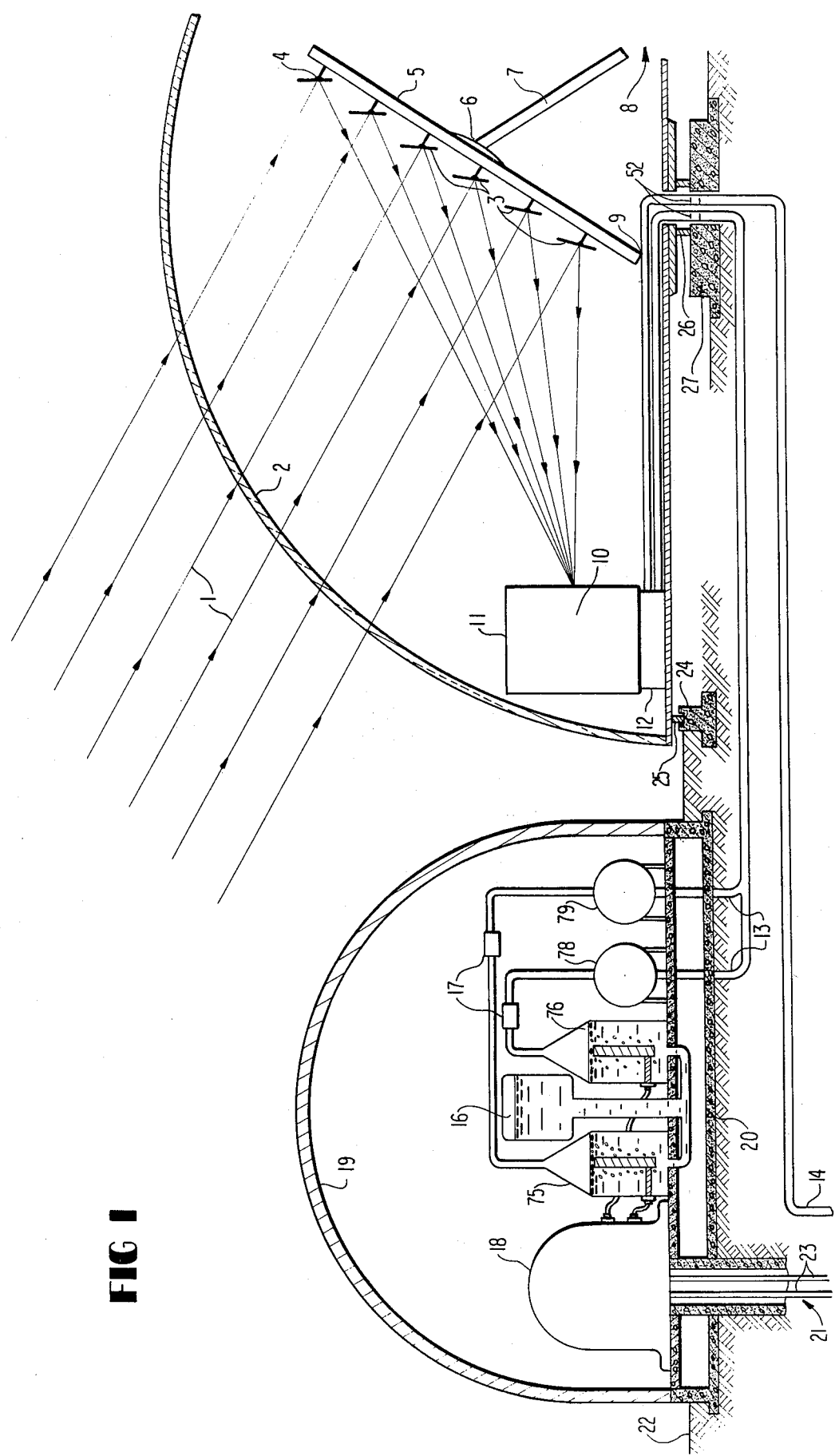
FIG. 1 shows a cross-sectional view of the above-ground portion of a solar-wind energy conversion system in accordance with the invention.

Referring first to FIG. 1, there is shown therein the above-ground portion of the solar-wind energy conversion system of the present invention. Sun's rays 1 pass through semi-circle transparent dome 1 and strike mirrors 3 which are individually positioned upon mounts 4 upon supporting frame 5 and by positioning of supporting member 7 attached to frame 5 through pin 6 so as to reflect the sun's rays and to concentrate them upon a focal point 10 within boiler 11. Mirrors 3 may either be plane flat mirrors or may have a curved surface, if desired, so as to further concentrate the sun's rays onto a smaller area. Boiler 11 may be any one of a number of well known designs having a burner 12 receiving gas from pipe 13. Steam produced by boiler 11 is conveyed to the underground portion of the system through pipe 14.

Boiler 11 and mirrors 3 upon frame 5 are mounted upon circularly-shaped rotatable platform 8. Rollers 25 mounted upon the lower surface of rotatable platform 8 at the outer periphery thereof ride upon track 24 as platform 8 is rotated. A rotatable joint 26 supported by concrete member 27 supports the center section of rotatable platform 8. Rotatable platform 8 is turned in accordance with the movements of the sun so as to direct the maximum available solar energy into boiler 11. A system for producing this type of rotation is disclosed in the article *SOLAR ENERGY* (MACMILLAN) PAGE 96. Rotatable joints 52 are also provided for pipes 13 and 14.

Figure 2:
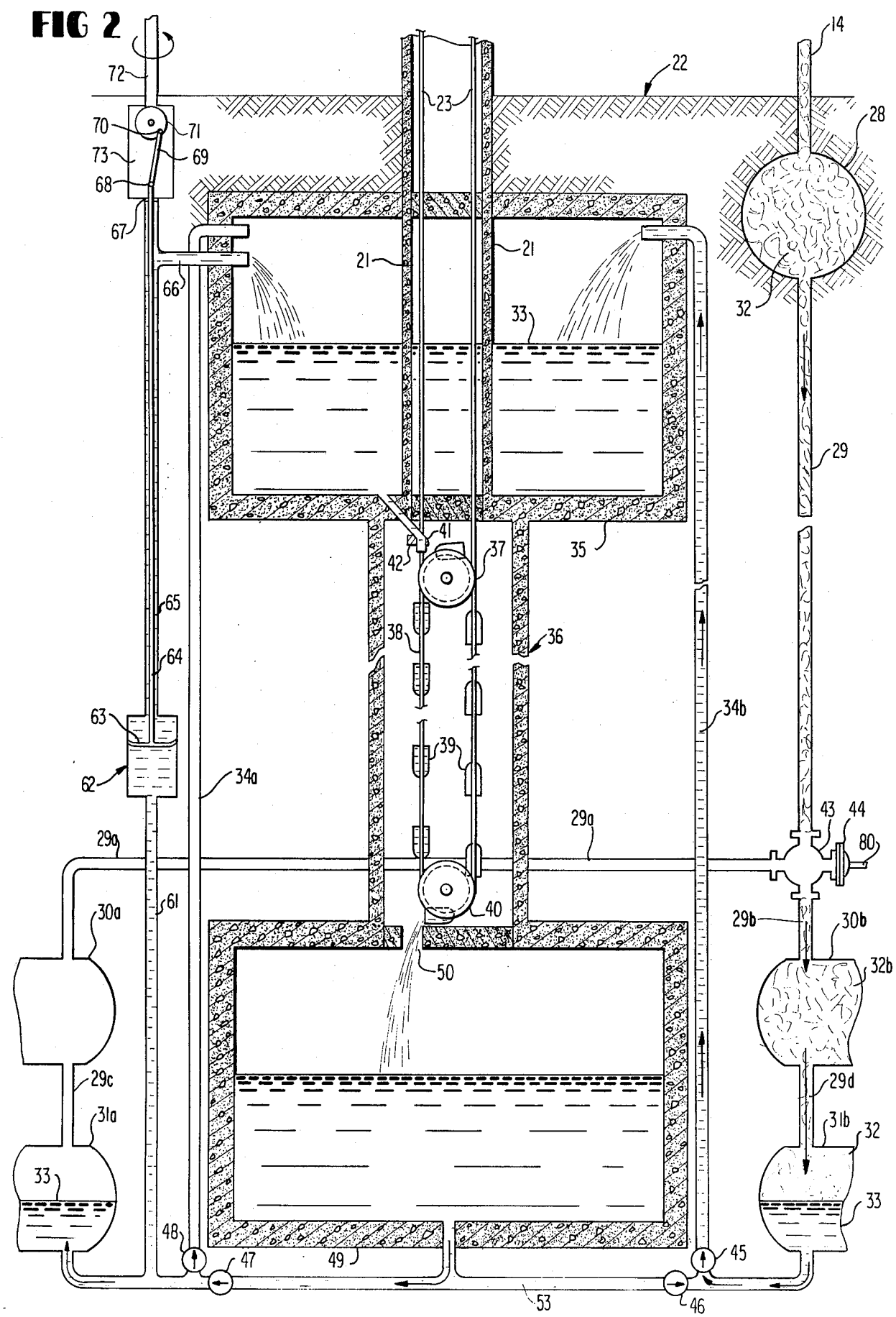
FIG. 2 shows the below-ground portion of the solar-wind energy conversion system of the invention.

Referring next to FIG. 2, steam flowing through pipe 14, which is a well-insulated pipe, flows into insulated storage tank 28. Steam 32 stored in tank 28 passes through pipe 29 and is directed by 3-way valve 43 to either pipe 29a or 29b to one of lower steam storage tanks 30a and 30b, respectively. The further operation of these will be described below.

Two relatively large water storage tanks, upper water storage tank 35 and lower water storage tank 49 are provided. Both of these are preferably made of cast concrete or a similar inexpensive material. Between upper water storage tank 35 and lower water storage tank 49 there is provided an endless-chain water bucket brigade system. This includes an upper pulley 37 positioned below the center of tank 35 and a lower pulley 40 positioned near the top of lower tank 49. Between pulleys 37 and 40 runs an endless chain 38 to which a number of bucket members 39 are coupled at spaced intervals. Endless-chain 38 may be a link-type chain, a flexible metal band, a rubberized belt or the like or multiple ones of one of these items. A third pulley, not shown, is coupled to the same shaft and rotates in response to the rotation of pulley 37. A second chain 23 is coupled around this pulley.

A spout 41 extends from the bottom of tank 35 reaching towards the open mouths of the bucket members passing around pulley 37. A trip valve 42 permits water to flow through spout 41 only when a bucket member is positioned thereunder.

Lower water storage tank 49 includes an aperture 50 in its upper surface for receiving water dumped by bucket members 39 as they pass around the lower portion of pulley 40. A pipe 53 carries water out of the bottom of tank 49 through one-way valves 46 and 47 which allow water to flow only in the direction indicated by arrows. Water pumping tanks 31a and 31b are coupled at the lower portion thereof to the outlets sides of valves 46 and 47. Tanks 31a and 31b are coupled by the same pipes through one-way valves 48 and 45 respectively, to pipes 34a and 34b which extend upwards into the upper portion of upper water storage tank 35.

Operationally, it is first assumed that water pumping tank 31b is filled with water. At the commencement of operations, valve 43 is opened to allow steam to pass through pipe 29a to pipe section 29b into tank 30b. The expanding steam then flows through pipe section 29d into the upper portion of water pumping tank 31b. The steam pressure forces the water out of water pumping tank 31b through one-way valve 45 into pipe 34d and into upper water storage tank 35.

When water storage tank 31b has been emptied of water, valve 43 closes off the flow of steam between pipes 29 and 29b. As the steam in tanks 30b and 31b cools it condenses forming a partial vacuum in both tanks. As a result of the partial vacuum, water is drawn out of lower water storage tank 49 through one-way valve 46 into water pumping tank 31b thereby refilling it.

While tank 31b is being refilled, valve 43 directs the flow of steam through pipe 29 to pipe 29a and into lower steam storage tank 30a. This, in turn, forces the water from water pumping tank 31a through one-way valve 48 into pipe 34a and accordingly, into upper water storage tank 35. Generally, one of tanks 31a and 31b is being filled from lower water storage tank 49 while the other is pumping water upwards into upper water storage tank 35.

When there is sufficient water within upper water storage tank 35, water flows through spout 41 as controlled by trip valve 42 filling bucket members 39 connected to endless chain member 38. The added weight of the water in the buckets on the left side as shown in the drawings creates a large torque on pulley 37 which causes the rotation thereof as well as the rotation of chain member 23 connected to the other pulley (not shown) located upon the same shaft as pulley 37. As bucket members 39 reach the bottom of pulley 40, they are tilted to the left thereby emptying the water therein through aperture 50 in the upper covered surface of lower water storage tank 49. The empty bucket members are returned towards the upper part of pulley 37 for refilling.

Figure 4:
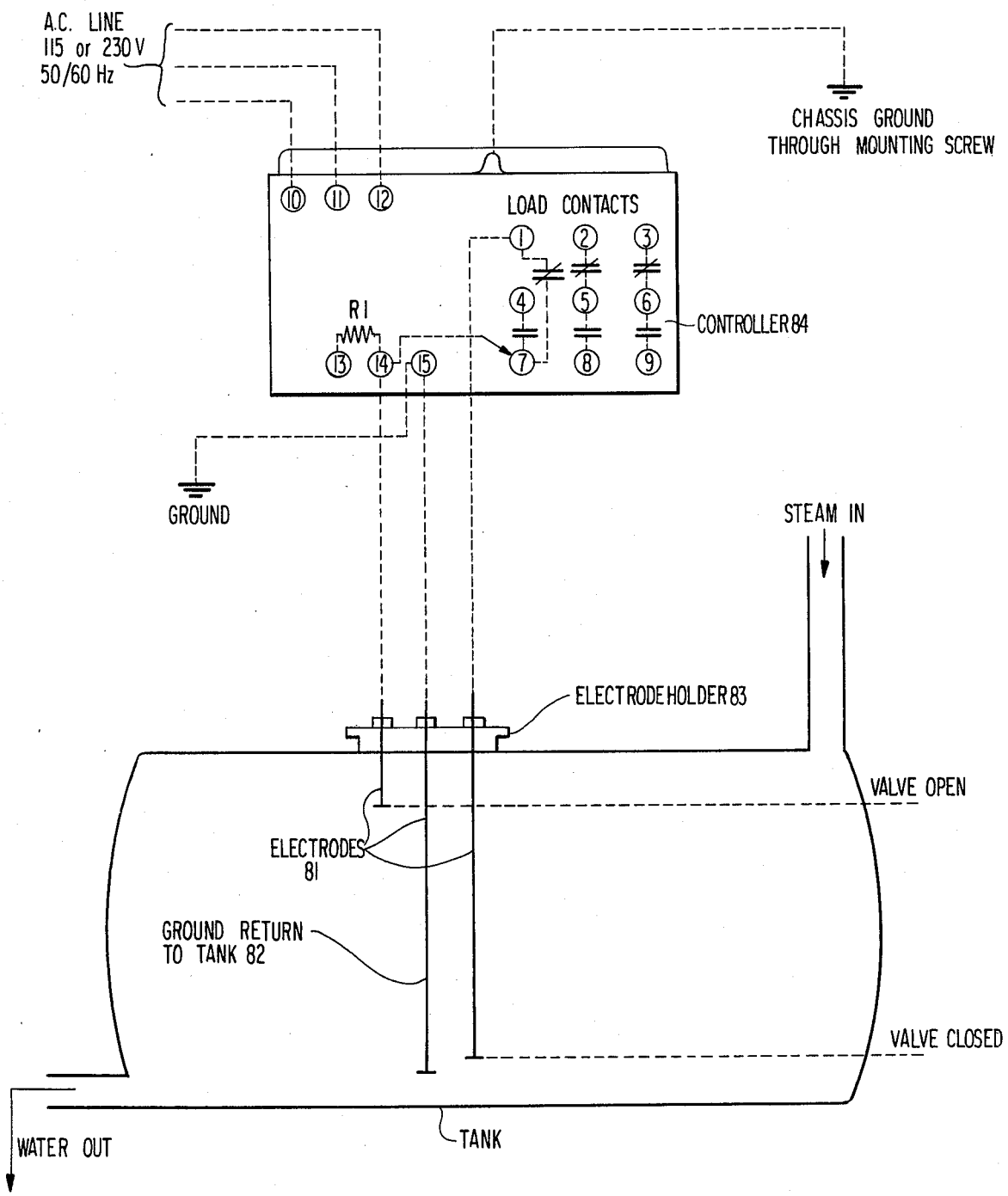
FIG. 4 shows the valve control system used with the portion of the system of the invention shown in FIG. 2.

FIG. 4 shows in diagram form the control system used to operate valve 43 of FIG. 2. The control system includes a controller 84 connected to electrodes 81, one of which is a ground return electrode 82. The end 2 of electrodes 81 sense the level of water in tank 31. When the water level is below the upper dotted line shown in the drawing, valve 43 is opened to allow steam flow between pipe 29 and pipe 29b. When the water falls below the lower dotted line, the valve is closed or turned to the other position. Electrodes 81 are supported by electrode holder 83 and are coupled to the input terminals of controller 84. Controller 84 is preferably a High Sensitivity Control Relay, Model B,W 52-120100 in a NEMA −1 enclosure as manufactured by Fisher Controls Company of Marshalltown, Iowa. Electrode holder 83 may be an E-1 electrode holder with electrode plug Model No. 04-126400 also manufactured by Fisher Controls Company. As these units are commercially available and their operation well known, it need not be described here further.

The discussion above is related to the production of energy in the form of rotational motion via water raising to higher level of potential energy by means of solar power. However, a second portion of the system is utilized for raising water between lower water storage tank 49 and upper water storage tank 35 in response to wind movement so that two means are provided for producing energy from two different natural sources so that the naturally-occurring energy available at the system's location is utilized to its maximum.

To this end a wind turbine device, which will be described in conjunction with FIG. 3, produces rotary motion in response to wind movement which rotates shaft 72. Threads are provided at the end of shaft 72 for rotating worm gear 71 as shaft 72 rotates. A follower arm 69 is pivotably connected at ends 68 and 70 respectively to lower reciprocating drive shaft 64 and the periphery of worm gear 71. Reciprocating drive shaft 64 passes through casing 73 which encloses the end of shaft 72, worm gear 71 and connecting rods 69, through seal 67.

Reciprocating drive shaft 64 extends through the center of pipe 65 to pumping section 62 at which its lower end is coupled to piston 63. Piston 63 is constructed with well known principles and includes the sealing member at the outer periphery thereof and a foot valve in intermediate portions. The lower end of pumping section 62 is coupled through pipe 61 to pipe 53 or to any location from which water from tank 49 can be pumped. If preferred, a separate connection to the lower portion of tank 49 can be provided.

In operation, the rotational shaft 72 causes worm gear 71 to rotate which produces reciprocating movement in reciprocating drive rod 64 via connecting rod 69. Reciprocating drive rod 64 operates pump section 62 to thereby pump water from lower water storage tank 49 through pipes 61 and 65 through outlet 66 into the upper portion of upper water storage tank 35. The potential energy of the system is thereby increased in response to energy generated by wind movement as well as by action of solar energy.

Referring now back to FIG. 1, endless chain 23 is coupled to electrical generator 18 which operates to produce electricity in response to rotation of endless chain 23. A number of well-known devices may be used for generator 18. The generator 18 is mounted on a concrete slab 20. A governor for controlling the rate of rotation of generator 18 may be provided if desired. In another embodiment, endless chain 23 is coupled to a hydraulic pump which in turn is coupled to a hydraulic motor which operates the generator. A compensator valve located between the hydraulic pump and hydraulic motor can then be used to perform the function of the governor. As shown in FIG. 1, the fuel for the burner 12 is supplied by hydrogen and oxygen gas derived by electrolyzing water. Water from tank 16 is supplied to a hydrogen electrolysis compartment 75 and oxygen electrolysis compartment 76. Both compartments receive current from the generator 18 and produce a gas output compressed by compressor 17. Tanks 78 and 79 store the compressed hydrogen and the compressed oxygen and supply it to pipe 13. Storage tank 79 contains a hydrogen absorbing material such as a hydride of an alloy of titanium, iron, magnesium or nickel as is well known in this art.

Figure 3:
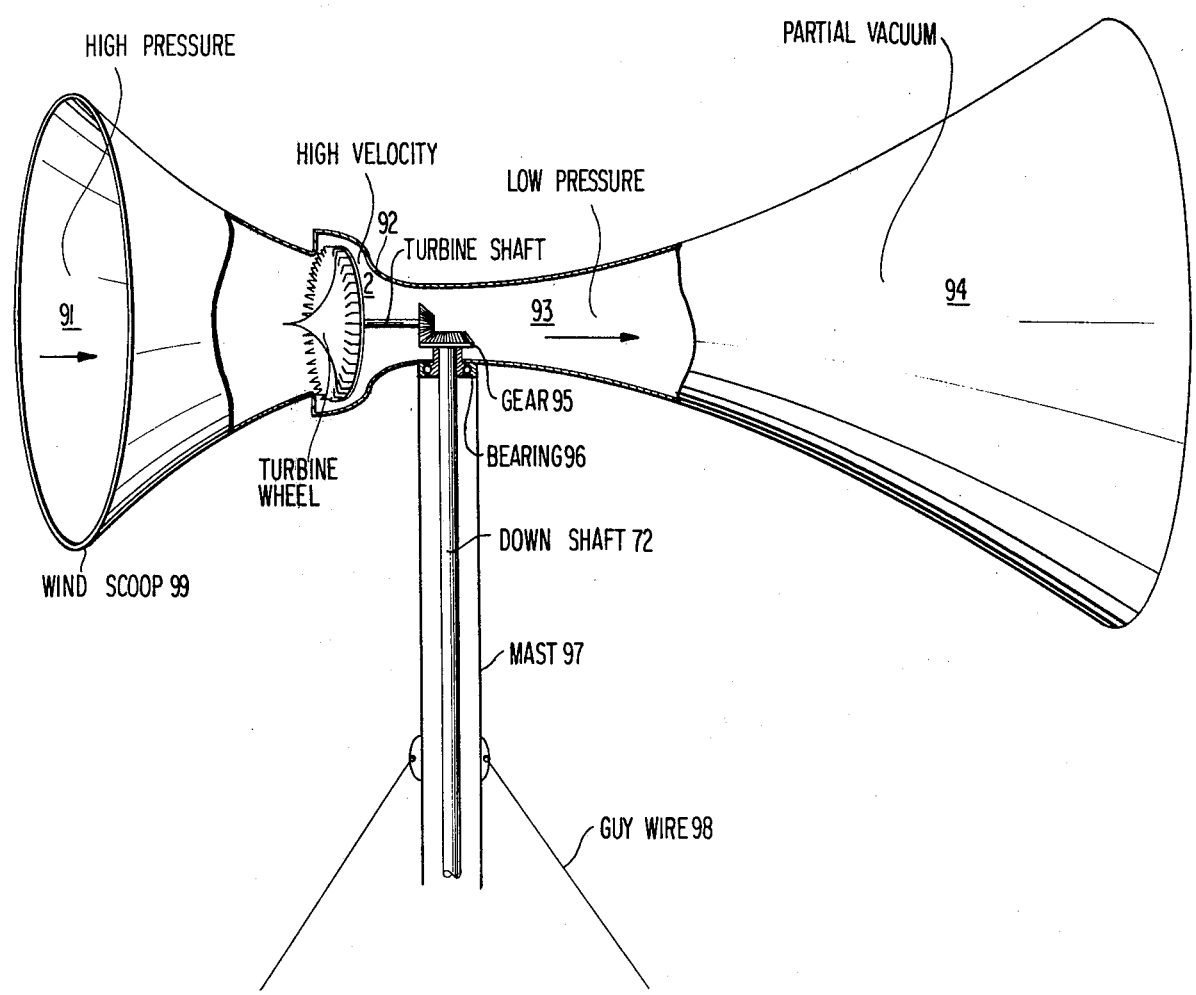
FIG. 3 shows a partially-cutaway view of a wind turbine which is utilized with the energy conversion system shown in FIGS. 1 and 2.

With reference to FIG. 3, there is shown a partially cut-away view of a wind turbine which may be utilized with the energy conversions system shown in FIGS. 1 and 2. The device includes two interconnected scoops or funnels including input wind scoop 99 and larger output cone 94. The incoming high pressure air enter at 91 and is concentrated by the right-hand portion of scoop 99. Its velocity is thereby increased by the point at which it strikes turbine wheel 92. Turbine wheel 92 is coupled through a turbine shaft to gears 95, the lower one of which is coupled directly to downshaft 72. The entire device rotates upon bearing 96 mounted upon the top of mast 97. Shaft 72 extends downward through mast 97 to the portion of the apparatus shown in FIG. 2. Guy wires 98 may be employed to support mast 97.

This completes the description of the preferred embodiments of the invention. Although preferred embodiments have been described, it is believed that numerous modifications and alterations thereto would be apparent to one having ordinary skill in the art without departing from the spirit and scope of the invention.

What is claimed is:

1. A solar energy conversion system comprising:
   boiler means for producing steam in response to solar energy;
   means for directing solar rays towards a predetermined portion of said boiler means;
   a primary steam storage tank for storing steam produced by said boiler means;
   a first water storage tank;
   a second water storage tank positioned beneath said first water storage tank;
   first and second lower steam storage tanks;
   valve means for selectively coupling said primary steam storage tank to one of said first and second lower steam storage tanks;
   first and second water pumping tanks, said first and second water pumping tanks being respectively coupled to said first and second lower steam storage tanks;
   first coupling means for coupling said first and second lower steam storage tanks to said second water storage tanks, said first coupling means having means for permitting water flow only in the direction of said first and second lower steam storage tanks;
   second coupling means for coupling said first and second lower steam storage tanks to said first water storage tanks, said second coupling means having means for permitting water flow only in the direction of said first water storage tank;
   first pulley means positioned in a region beneath said first water storage tank;
   second pulley means positioned in a region above said second water storage tank;
   a first endless chain member running between said first and second pulley means;
   a plurality of bucket means coupled to said chain member at spaced intervals;
   water spout means for moving water from said first water storage tank to said bucket means in the vicinity of said first pulley means;
   said second water storage tank having an aperture in the upper portion thereof for receiving water from said bucket means;
   a second endless chain member coupled to said second pulley means; and
   an electrical generator, said second chain member being coupled to provide input operating power to said electrical generator.

2. The solar energy conversion system of claim 1 further comprising:
   means for electrolyzing water to produce hydrogen and oxygen therefrom in response to electrical current produced by said electrical generator;
   means for compressing said hydrogen and oxygen;
   a storage tank for receiving the compressed hydrogen;
   a hydrogen absorbing medium within said tank for receiving the compressed hydrogen;
   a storage tank for receiving the compressed oxygen;
   means for burning at a controlled rate hydrogen and oxygen from said storage tanks for receiving the compressed hydrogen and oxygen to heat said boiler means.

3. The solar energy conversion system of claim 2 wherein said hydrogen absorbing medium comprises a hydride of an alloy of titanium and iron.

4. The solar energy conversion system of claim 2 wherein said hydrogen absorbing material comprises a hydride of an alloy of magnesium and nickel.

5. The solar energy conversion system of claim 1 further comprising:
   means for producing rotational power from wind movement; and
   means for moving water from said second water storage tank to said first water storage tank in response to said rotational power.

6. In combination:
boiler means responsive to input solar energy for producing steam;
means for producing kinetic mechanical energy in response to wind movement;
means receiving said steam and producing kinetic mechanical energy;
means for producing electrical energy in response to both said kinetic mechanical energy produced in response to input solar energy and produced in response to said wind movement;
means for storing energy produced in response to said electrical energy, said means for producing electrical energy also producing electrical energy in response to energy stored by said storing means;
heating means receiving the output of said means for storing to heat said boiler when the solar energy received by said boiler means falls below a predetermined level;
means for directing solar energy towards and for concentrating solar energy at said boiler;
a first water storage tank;
a second water storage tank, said second water storage tank being at a lower position than said first water storage tank;
said means receiving steam comprising means for moving water from said second water storage tank to said first water storage tank in response to steam produced by said boiler;
means for returning water from said first water storage tank to said second water storage tank; and
wherein electricity is generated in response to movement of water by said returning means.

7. The solar energy conversion system of claim 6 wherein said energy storing means comprises:
means for electrolyzing water in response to said electrical energy;
means for storing hydrogen produced by said electrolyzing means; and
means for storing oxygen produced by said electrolyzing means.

8. The solar energy conversion system of claim 7 wherein said hydrogen storing means comprises:
a tank; and
a gas absorbing medium positioned within said tank.

9. The solar energy conversion system of claim 8 wherein said gas absorbing medium comprises a hydride of an alloy of titanium and iron.

10. The solar energy conversion system of claim 9 wherein said gas absorbing medium comprises a hydride of an alloy of magnesium and nickel.

11. The solar energy conversion system of claim 6 further comprising:
said means responsive to wind movement moves water from said second tank to said first tank in response to wind movement.

12. The solar energy conversion system of claim 6 wherein said means for moving water from said second tank to said first tank in response to said steam comprises:
a water pumping tank having a first port in an upper portion thereof and a second port in a lower portion thereof;
means for coupling said first port to said boiler means for receiving steam therefrom;
means for coupling said second port to said first tank, including therein means for permitting water flow only in the direction of said first tank; and
means for coupling said second port to said second tank including therein means for permitting water flow only in the direction of said water pumping tank.

* * * * *